United States Patent [19]

Nucci

[11] Patent Number: 5,802,764
[45] Date of Patent: Sep. 8, 1998

[54] MOISTURE INDICATOR FOR HANGING PLANT CONTAINERS

[76] Inventor: Michael J. Nucci, 5 Center La., Delmar, N.Y. 12054

[21] Appl. No.: 713,542

[22] Filed: Sep. 3, 1996

[51] Int. Cl.⁶ ............................... A01G 9/02; A47G 7/02
[52] U.S. Cl. ..................................................... 47/67; 47/39
[58] Field of Search ................................. 47/67, 39, 65.5

[56] References Cited

U.S. PATENT DOCUMENTS

| | | |
|---|---|---|
| 3,967,578 | 7/1976 | Gallo . |
| 4,078,625 | 3/1978 | Loeb . |
| 4,241,538 | 12/1980 | Lahr . |
| 4,454,831 | 6/1984 | Gallo . |
| 4,480,465 | 11/1984 | Chase . |
| 4,760,666 | 8/1988 | Han . |
| 4,825,591 | 5/1989 | Han . |
| 5,079,869 | 1/1992 | Dawson . |
| 5,315,784 | 5/1994 | Henehan . |

FOREIGN PATENT DOCUMENTS

| | | | |
|---|---|---|---|
| 2268593 | 1/1994 | United Kingdom | ........................ 47/67 |
| 2268594 | 1/1994 | United Kingdom | ................... 47/67 H |

*Primary Examiner*—Michael J. Carone
*Assistant Examiner*—Joanne C. Downs
*Attorney, Agent, or Firm*—Schmeiser, Olsen & Watts

[57] ABSTRACT

A spring scale adapted to weigh containers carrying fluids. In particular, there is a scale for holding hanging plants that indicates when it is time to water the hanging plant. The hanging plant scale has a visual indicator that informs when the plant needs to be watered. Specifically, the visual indicator is a humming bird and a flower. When the humming bird's beak is inserted into the flower a user will know that the plant contains enough water, and when the humming bird is far from the flower it is indicated that the plant needs watering.

8 Claims, 3 Drawing Sheets

MOISTURE INDICATOR FOR HANGING PLANT CONTAINERS

BACKGROUND OF THE INVENTION

1. Field of the Invention

This invention relates to a spring scale adapted to weigh containers carrying fluids. In particular, for scale for holding hanging plants that indicates when it is time to water the hanging plant.

2. Description of the Related Art

Various devices have attempted to dependently support a potted hanging plant and moreover, will provide some form of visual indication of the moisture content of the potted plant.

Examples of patents that are related to the present invention are as follows, and each patent is herein incorporated by reference for the supporting teachings:

U.S. Pat. No. 5,315,784, is a device for rotating a hanging plant to keep it from growing lopsided. The device has contracting coaxial tension springs of opposite hand that rotate the plant first in one direction when the plant is watered and then in the opposite direction as the plant goes from wet to dry.

U.S. Pat. No. 4,825,591, is a watering device for plants including a plant container that is balanced o a vertical moving rod by a spring and a water reservoir tank. The device is operatively associated with the plant container so that as the plant container becomes lighter due to a loss of water, the spring member disposed at the opposite end of the vertical moving rod from the plant container actuates a valve in the water reservoir tank and transfers water from the water reservoir tank to the plant container until a balance is again achieved, and when the balance is reached, the valve in the water tank is again closed.

U.S. Pat. No. 4,760,666, is a watering device for plants comprising a plant container hat is balanced on a horizontal pivot rod by an adjusting weight member. A water reservoir tank is operatively associated with the plant container so that as the plant container becomes lighter as to a loss of water. The adjusting weight member disposed at the opposite end of the horizontal pivot rod form the plant container actuates a valve in the water reservoir tank and transfer water from the water reservoir tank to the plant container until a balance is again achieved.

U.S. Pat. No. 4,480,465, is a device for visually indicating the moisture content of a potted plant. It has an elongated flexible visual moisture indicator member and a reciprocally moveable support member operatively associated with the housing and is fixed to the indicating member so that movement of the support member between high and low positions responsively effects flexible downward and upward displacement respectively, of the exposed portion of the indication member extending exteriorly of the housing.

U.S. Pat. No. 4,454,831, is a watering indicator for hanging plants, with two support elements, a spring resisting separation of the support elements, a mask element connected to one support element and adapted to be moved along that element when the two elements move relative to one another, and indicator element with an indication indicia mounted to the other support element, all adapted so that the indication indicia is covered by the mask element when the plant is watered and is later exposed when the plant dries out.

U.S. Pat. No. 4,078,625, is an apparatus having a spring biased shaft providing vertical support to a hanging plant container. The weight of the container reflects the moisture content of the soil within the container.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

It is a feature of the invention to provide a spring scale adapted to weigh containers carrying fluids. In particular, there is a scale for holding hanging plants that indicates when it is time to water the hanging plant.

An additional feature of the invention is to provide a hanging plant scale that has a visual indicator that informs when the plant needs to be watered.

A further feature of the invention is to provide a visual indicator that has a humming bird and a flower. In particular, when the humming bird's beak is inserted into the flower a user will know that the plant contains enough water, and when the humming bird is far from the flower it is indicated that the plant needs watering.

And yet a further feature of the invention is that the humming bird moves in an arcuate direction toward and away from the flower. In particular the flower and humming bird are mounted upon an disc shaped visual scale indicator device.

The invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, neither is it intended to be limiting as to the scope of the invention in any way.

Other features of the present invention will become more clear from the following detailed description of the invention, taken in conjunction with the accompanying drawings and claims, or may be learned by the practice of the invention.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the use of the accompanying drawings.

Charter by the U.S. Constitution

This disclosure of the invention is submitted in furtherance of the constitutional purposes of the United States Patent Laws "to promote the progress of science and useful arts," as stated in Article 1, Section 8 of the United States Constitution.

DETAILED DESCRIPTION OF THE PREFERRED EMBODIMENT

Figure 1:
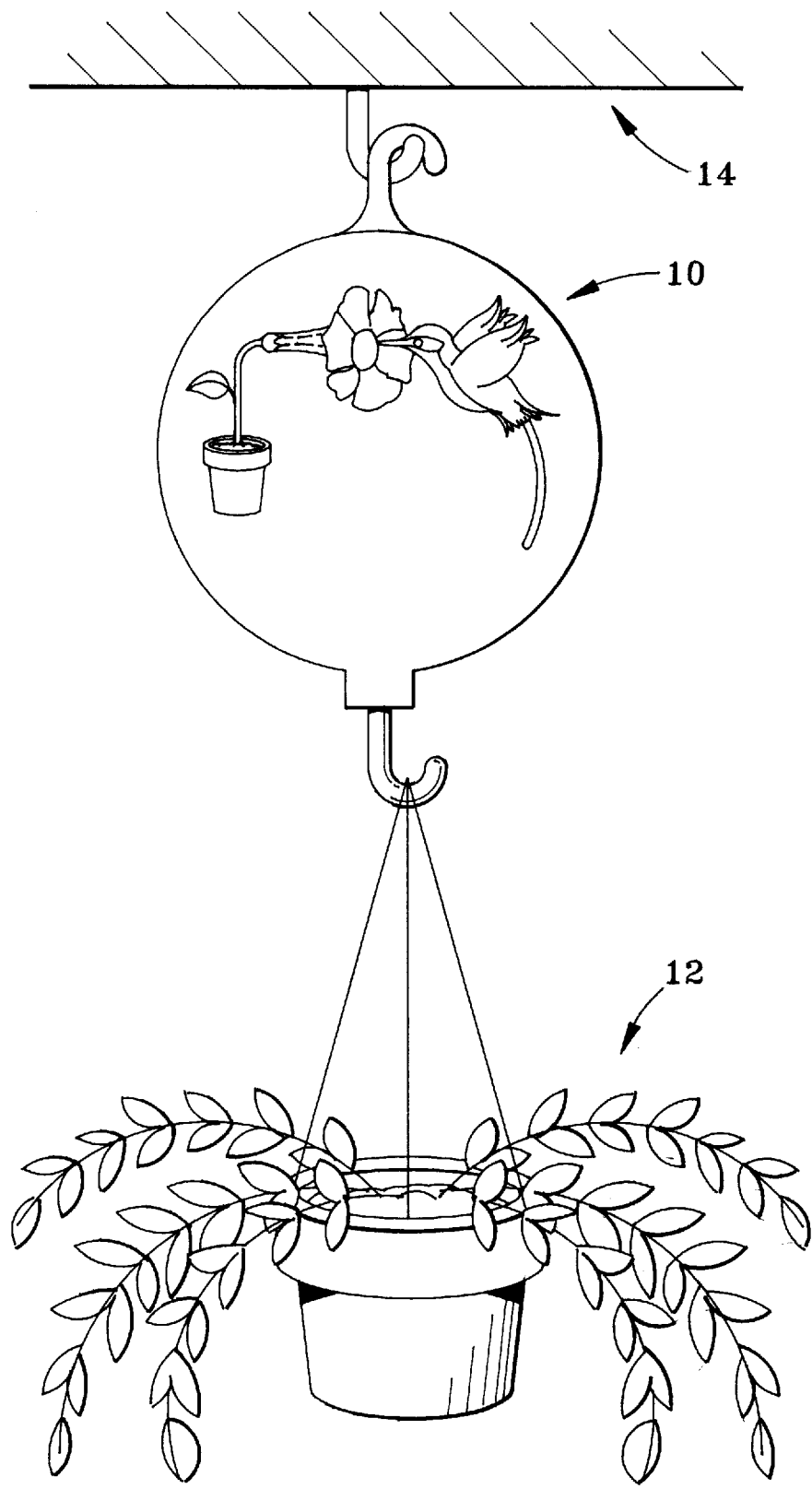
FIG. 1 is a view of the preferred embodiment coupled between a ceiling and hanging plant.

Referring to FIG. 1, there is a view of the preferred embodiment coupled between a ceiling and hanging plant. In particular there is a visual indicating scale 10 coupled to a hanging plant 12 and a ceiling structure 14.

Figure 2:
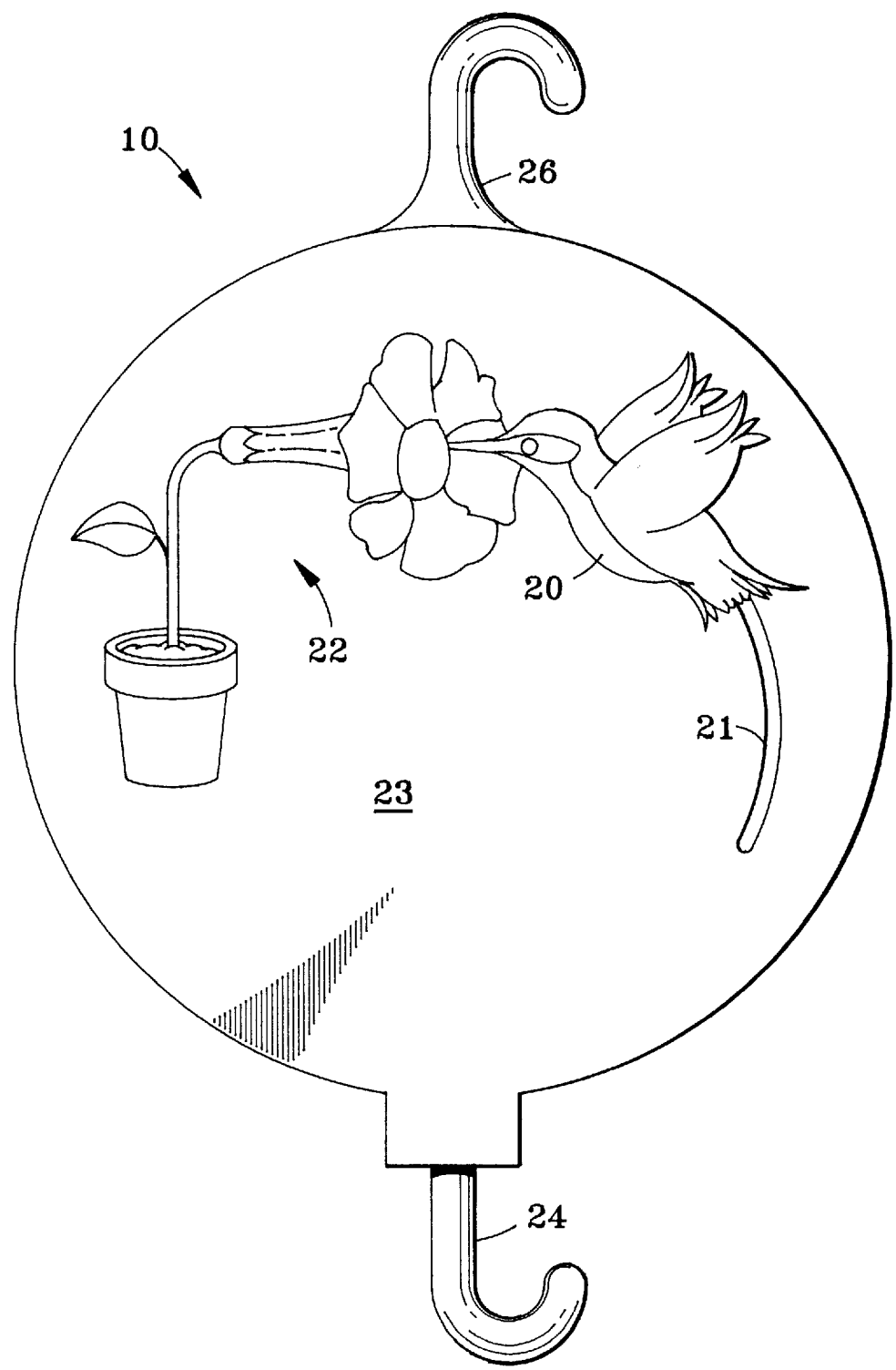
FIG. 2 is a simplified view of the scale illustrating the visual preferred embodiment of the invention.

Referring to FIG. 2, there is a simplified view of the scale illustrating the visual preferred embodiment of the invention 10. In particular, there is a movable visual icon 20 in the form of a humming bird, a fixed visual icon 22 in the form of a flower, a groove 21 for allowing the humming bird 20 to arcuately move toward and away form the flower 22, a round visual display plate 23 for supporting the flower 22 and other parts of the preferred embodiment, a bottom hook 24 for coupling to a hanging plant (not shown), and a top hook 26 for coupling to a ceiling structure (not shown).

Figure 3:
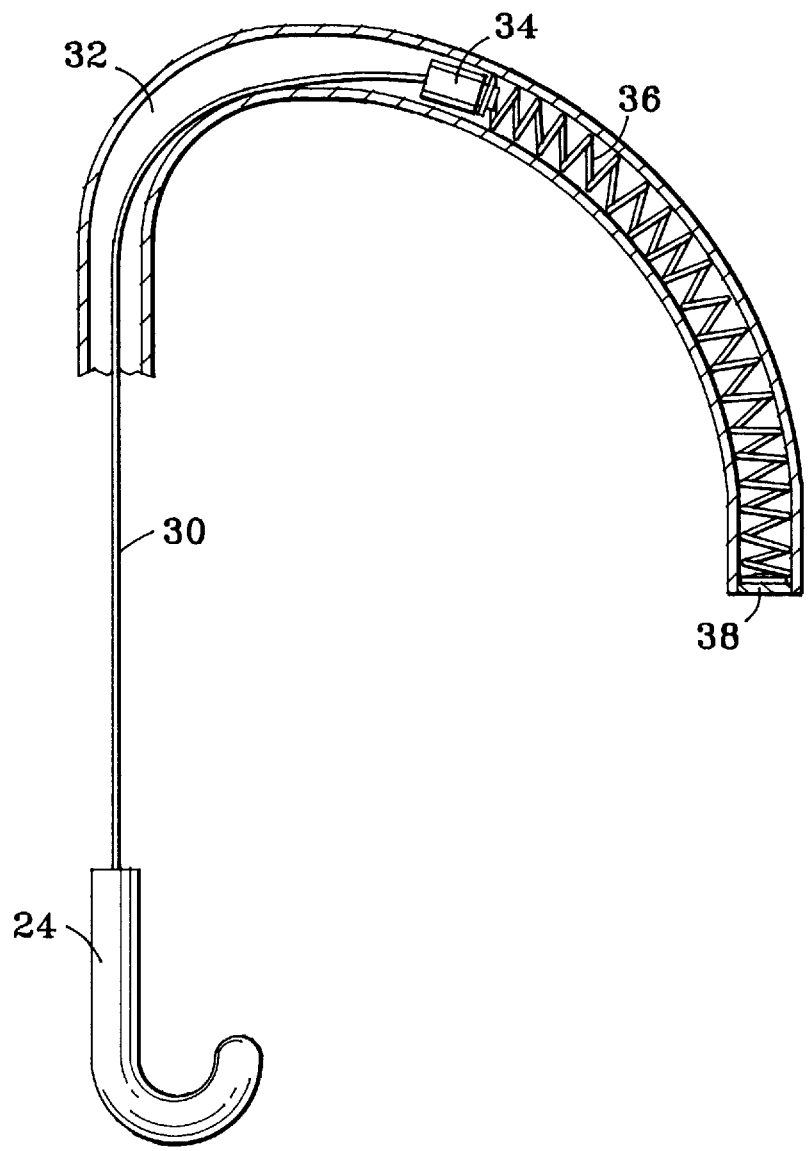
FIG. 3 is a cutaway view of the internal mechanism for causing the movement of the humming bird.

FIG. 3 is a cutaway view of the internal mechanism for causing the movement of the humming bird. In particular, there is the bottom hook 24, coupled to an extension piece 30 in the form of a cord, a hollow tube 32 for housing the internal mechanism, a holder 34 that is attached to the back side of the humming bird (not shown) for fitting into the groove 21 (not shown), a second extension piece 36 in the form of a spring, and an attachment device 38 for attaching the spring 36 to the tube 32.

In operation, as the plant is watered it increases in weight and thus pulls down on hook 24. As weight is applied to hook 24 cord 30 will be pulled downward and cause holder 34 to slide upward along groove 21 and thus move humming bird 20 upward. Eventually, as the water evaporates from the plant 12, it will become lighter, thus spring 36 will pull holder 34 toward attachment 38, and indicating that the plant is becoming dryer by visually showing the humming bird 20 located away from the flower 22.

Remarks About the Preferred Embodiment

One of ordinary skill in the spring weights and hanging plant design will realize many of the advantages from using the preferred embodiment. For example, the design of the visual indicator make it easy to determine from a distance when the plant needs to be watered.

Variations of the Preferred Embodiment

One of ordinary skill in the art of designing hanging plant spring weights will realize that there are many variations that can be made to the preferred embodiment. For example, the two extensions 30 and 36 can both be springs, the length of the springs could be very long and extend around the whole periphery of the visual display plate 23. The visual display plate could be most any shape like square or contoured to fit around the flower and other features of the invention. The visual display could work in an opposite direction. Specifically, the humming bird could be pulled away from the flower when the plant has been watered enough, and thus the humming bird would insert its beak into the flower to indicate when the plant needs watering. It is also contemplated to use most any icon for visual displays of the humming bird and flower. For example, an eagle, car, truck, house, garage, air plane, air plane hanger, people, fish, or trees to name a few alternatives.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. An apparatus for coupling a hanging potted plant to a ceiling, comprising:
    a) a first support for coupling the apparatus to the hanging potted plant and a second support for coupling the apparatus to the ceiling;
    b) a movable visual icon that moves from an upward position visually indicative of a fully watered potted plant to a downward position visually indicative of a dried out potted plant; and
    c) a fixed visual icon that is fixed relative to the movable visual icon positioned to be close to the movable visual icon when the potted plant is fully watered and to be positioned away from the movable visual icon when the potted plant is dry.

2. The apparatus of claim 1, wherein the movable visual icon moves in an arcuate movement toward and away from the fixed visual icon.

3. The apparatus of claim 1, wherein the movable visual icon is a humming bird.

4. The apparatus of claim 1, wherein the fixed visual icon is a flower.

5. The apparatus of claim 1, further comprising an extension, coupled to the first support and coupled to the movable visual icon, for moving the movable visual icon toward the fixed visual icon as the potted plant is watered.

6. The apparatus of claim 5, further comprising a second extension, coupled to the movable visual icon and extending within the apparatus, for forcing the movable visual icon away from the fixed visual icon.

7. The apparatus of claim 6, wherein the second extension is a spring.

8. An apparatus for coupling a hanging potted plant to a ceiling, comprising:
    a fixed visual icon;
    a movable visual icon wherein said movable visual icon moves to a first position proximate to said fixed visual icon indicative of a dried out potted plant and to a second position away from said fixed visual icon indicative of a fully watered potted plant; and a first and second extension joined in an arcuate position within the apparatus and attached to said movable visual icon wherein said first extension includes means for attaching a potted plant to said apparatus such that when the attached potted plant is dried out, the movable visual icon moves to said first position and when said attached potted plant is fully watered, said movable visual icon moves to said second position.

* * * * *